United States Patent
Serio

(10) Patent No.: US 6,460,512 B1
(45) Date of Patent: Oct. 8, 2002

(54) COMBUSTION GASKET HAVING DUAL MATERIAL STRUCTURES

(75) Inventor: John A. Serio, Lake in the Hills, IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 13 days.

(21) Appl. No.: 09/690,557

(22) Filed: Oct. 16, 2000

(51) Int. Cl.$^7$ .............................................. F02M 37/04
(52) U.S. Cl. ...................................... 123/470; 123/509
(58) Field of Search ............................... 123/470, 41.31, 123/541, 509; 277/650, 653, 644, 648, 637

(56) References Cited

U.S. PATENT DOCUMENTS

| | | |
|---|---|---|
| 3,576,330 | 4/1971 | Gard |
| 3,770,181 | 11/1973 | Stahl |
| 4,519,371 * | 5/1985 | Nagase et al. ............... 123/470 |
| 4,721,081 * | 1/1988 | Krauja et al. ............... 123/298 |
| 4,776,602 | 10/1988 | Gallo |
| 4,849,295 | 7/1989 | Dickerman et al. |
| 5,121,730 | 6/1992 | Ausman et al. |
| 5,345,913 * | 9/1994 | Belshaw et al. ............. 123/470 |
| 5,413,359 * | 5/1995 | Latty ............................ 277/180 |
| 5,487,368 | 1/1996 | Bruning |
| 5,524,907 * | 6/1996 | Walser ......................... 277/189 |
| 5,659,876 | 8/1997 | Mizuta |
| 5,662,337 * | 9/1997 | Surbrook et al. ........ 277/235 B |
| 5,752,487 | 5/1998 | Harrell et al. |
| 5,785,024 | 7/1998 | Takei et al. |
| 5,893,566 | 4/1999 | Miyaoh et al. |
| 5,951,021 | 9/1999 | Ueta |
| 6,186,123 * | 2/2001 | Maier et al. ................. 123/470 |

* cited by examiner

*Primary Examiner*—Carl S. Miller
(74) *Attorney, Agent, or Firm*—Dennis Kelly Sullivan; Jeffrey P. Calfa; Neil T. Powell

(57) ABSTRACT

A combustion gasket having dual material structures is provided. The combustion gasket has a rigid material structure adjacent to a resilient material structure. The rigid and resilient material structures independently engage the connected surfaces. In the case of a fuel injector mounted on a cylinder head of an internal combustion engine, the connected surfaces are an injector ledge formed by the fuel injector and a cylinder ledge formed by the cylinder head. The rigid material structure bears the load, for example of a fuel injector, and may partially seal the connection.

12 Claims, 4 Drawing Sheets

COMBUSTION GASKET HAVING DUAL MATERIAL STRUCTURES

FIELD OF THE INVENTION

This invention relates generally to combustion gaskets. More particularly, this invention relates to combustion gaskets for fuel injectors in internal combustion engines.

BACKGROUND OF THE INVENTION

Many internal combustion engines use fuel injectors to provide fuel to the cylinders. In a typical configuration, fuel injectors are mounted on the cylinder head in specially designed injector ports. Each fuel injector protrudes slightly into a cylinder to provide fuel at the proper time during the engine's combustion cycle. Most fuel injectors operate using high-pressure hydraulic fluid. The pressure of the hydraulic fluid changes depending upon the operating condition of the engine.

The fuel injectors must be held in place. If not secured, the high-pressure hydraulic fluid and combustion gases will cause the injector to move out of position. The position of injector also may shift because the hydraulic pressure and combustion gases fluctuate throughout the engine's combustion cycle. In a typical engine configuration, a clamp, bolt, or similar retaining device holds each fuel injector in place.

In addition, the fuel injector must be properly sealed against the cylinder head. If not properly sealed, combustion gases may enter the injector port and damage the fuel injector and other engine parts. In conventional designs, a combustion gasket is disposed between the fuel injector and the cylinder head. For an effective seal, there must be sufficient loading to compress the gasket against the sealing surface. There must not be excessive loading of the gasket. Excessive loading over compresses the gasket, essentially eliminating its sealing capability. In addition, the load on the gasket will cause creep relaxation if the gasket is not properly designed.

The loading from the retaining device on the fuel injector complicates matters. During assembly, installation, and maintenance procedures there is a tendency to make sure the fuel injectors are well secured. The loading from the retaining device may over compress the gasket initially and increase the creep relaxation of the gasket over time.

In addition, the combustion gasket needs to accommodate variations in the connection of the fuel injector and the cylinder head. The fuel injector may shift in the injector port due to the manufacturing tolerances for the injector and/or the cylinder head. This shifting may increase the load on one part of the combustion gasket and decrease the load on another part of the combustion gasket. Also, the sealing surfaces may be blocked by surface finish aspirates and foreign material from removal and cleaning processes.

The combustion gaskets in conventional designs are usually made of one of the following materials: dead soft copper (solid or embossed), aluminum (solid or embossed), embossed stainless steel, rubber coated embossed stainless steel, clad stainless steel (one or both sides with copper, nickel, silver, gold, etc.), graphite or graphite-filled composite wrapped with stainless steel, or folded ferrous and non-ferrous materials. Some engine designs seat the fuel injector on a taper, which creates a metal-to-metal seal.

These conventional combustion gaskets do not effectively seal the connection of the fuel injector to the cylinder head. Some are sufficiently resilient to seal the connection. However, they do not resist creep relaxation nor do they adapt effectively to accommodate any shifting of the injector. Other designs resist creep relaxation, but are not sufficiently resilient to adequately seal the connection.

Accordingly, there is a need for a combustion gasket resistant to creep relaxation and sufficiently resilient to seal the connection between a fuel injector and a cylinder head under various environmental conditions.

BRIEF SUMMARY OF THE INVENTION

The present invention provides a combustion gasket that resists creep relaxation and is sufficiently resilient to seal the connected surfaces. The combustion gasket has a rigid material structure adjacent to a resilient material structure. The rigid material structure is made from stainless steel or another material that can bear the loading from the fuel injector and resist creep relaxation. The resilient material structure is made from dead soft copper, aluminum, an elastomer, or other material that can adapt to seal the connection between a fuel injector and a cylinder head or similar connected surfaces.

The rigid and resilient material structures are press fitted together. In an alternate embodiment, they are interlocked together. The resilient material structure is adjacent to a peripheral edge of the rigid material. The material structures may be connected directly or separated by other materials, layers, and a gap. The resilient material structure is thicker than the rigid material structure.

The rigid and resilient material structures independently engage the connected surfaces. In the case of a fuel injector, the connected surfaces are an injector ledge formed by the fuel injector and a cylinder ledge formed by the cylinder head. The rigid material structure bears the load of the fuel injector. The resilient material structure is compressed sufficiently to seal the connected surfaces, but not over compressed. The rigid material may partially seal the injector, creating an "orifice" to reduce the flow of combustion gases. In this configuration, the rigid and resilient material structures form a double seal of the connected surfaces.

The following drawings and description set forth additional advantages and benefits of the invention. More advantages and benefits are obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE INVENTION

Figure 1:
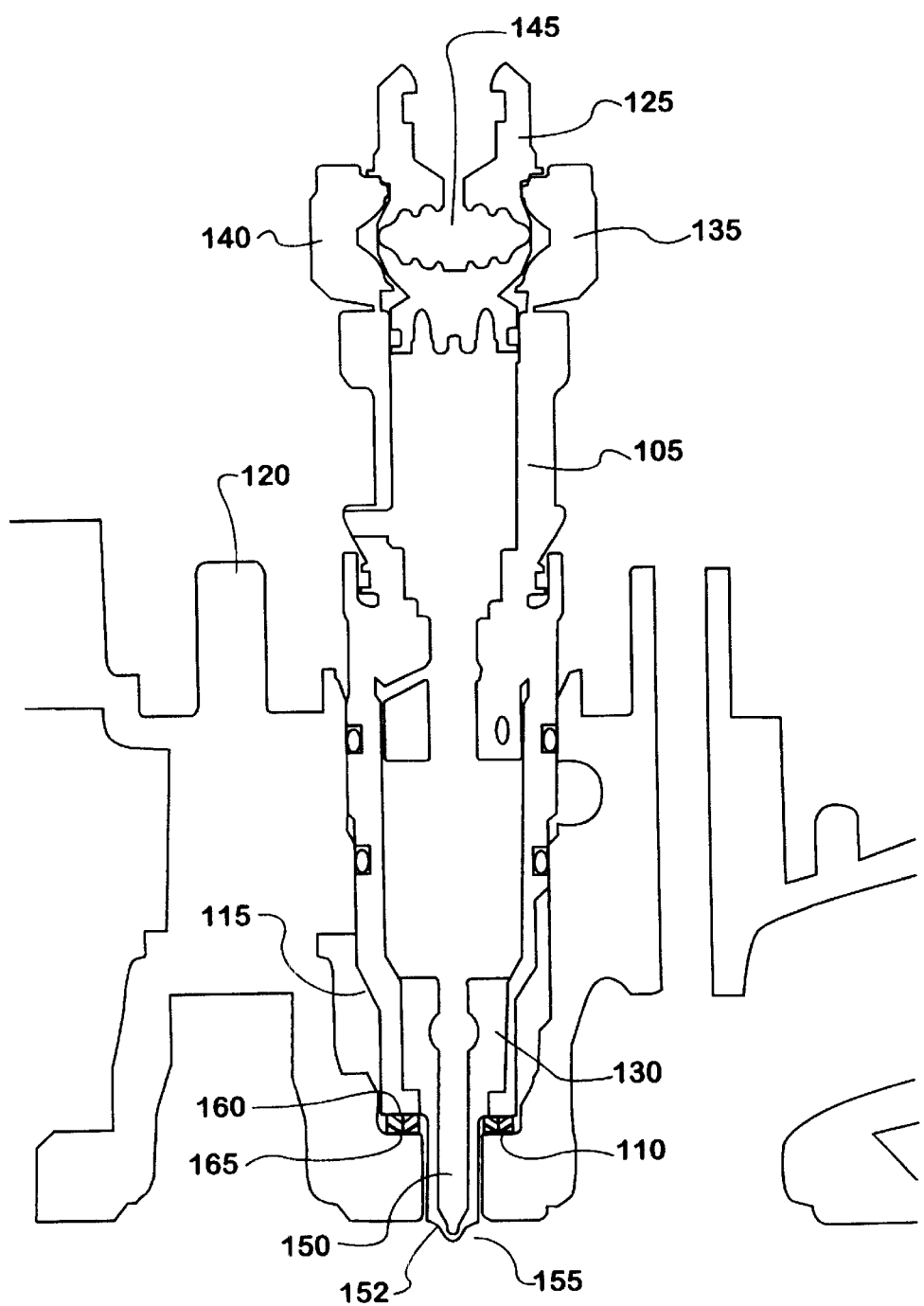
FIG. 1 shows a fuel injector mounted on a cylinder head of an internal combustion engine having a combustion gasket according to a preferred embodiment of the present invention.

FIG. 1 shows a fuel injector 105 mounted on a cylinder head 120 having a combustion gasket 110 according to the present invention. The fuel injector 105 is part of a hydraulically actuated electronically controlled unit injection (HEUI) fuel injection system. The fuel injector 105 is inserted into an injector port 115 formed by the cylinder head 120. The cylinder head 120 is part of an internal combustion engine (not shown). The internal combustion engine is preferably a diesel engine. When installed, the combustion gasket 110 operatively engages the fuel injector 105 and the cylinder head 120 for sealing their connection. Other injector designs and injection systems may be used. Other cylinder head designs may be used, including those using a cylinder head insert.

The fuel injector 105 has a fuel pressurization assembly 125 and a nozzle assembly 130. The fuel pressurization assembly 125 has a first solenoid 135 and a second solenoid 140 for operating a spool valve 145. In this design, high-pressure hydraulic fluid enters the fuel injector 105 via the spool valve 145. The high-pressure hydraulic fluid actuates a piston (not shown), thus pressurizing the fuel. Other types of fuel injectors may be used including those with a poppet valve actuated by a single solenoid.

The nozzle assembly 130 has a nozzle valve 150, which typically has an actuating needle for injecting fuel through a nozzle 152 into a cylinder 155. The nozzle 152 protrudes slightly into the cylinder 155.

The nozzle assembly 130 forms a nozzle ledge 160 for interfacing with the combustion gasket 110. The nozzle ledge 160 corresponds to the position of a cylinder ledge 165 formed by the cylinder head 120 for interfacing with the combustion gasket 110. When assembled, the combustion gasket 110 operatively engages the connected surfaces of the fuel injector 105 and the cylinder head 120—in this case, the nozzle ledge 160 and the cylinder ledge 165. While the ledges 160, 165 are preferred, the present invention may be utilized without one or both of them.

Figure 2:
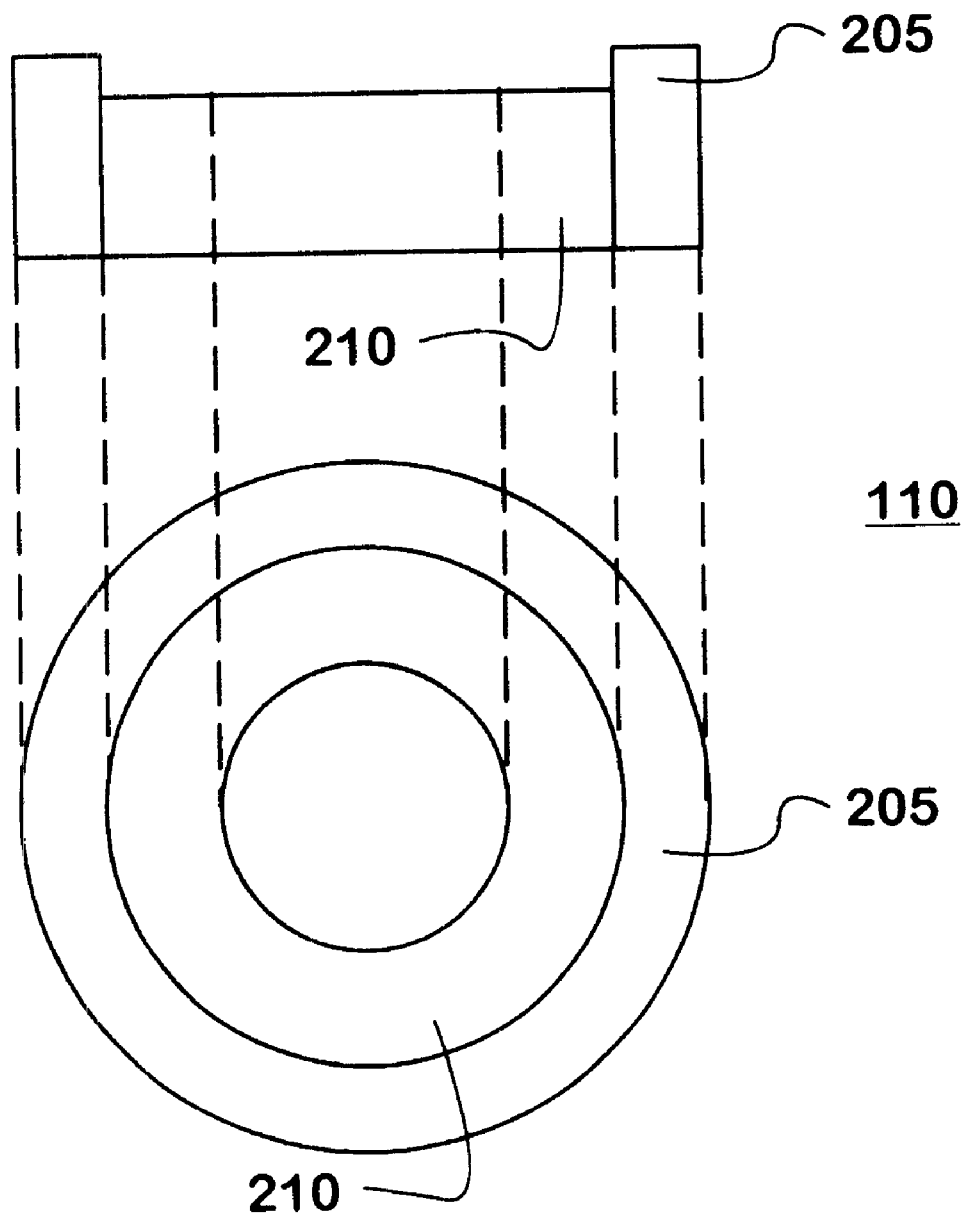
FIG. 2 shows top and side perspective views of a combustion gasket (assembled) according to a preferred embodiment of the present invention.
Figure 3:
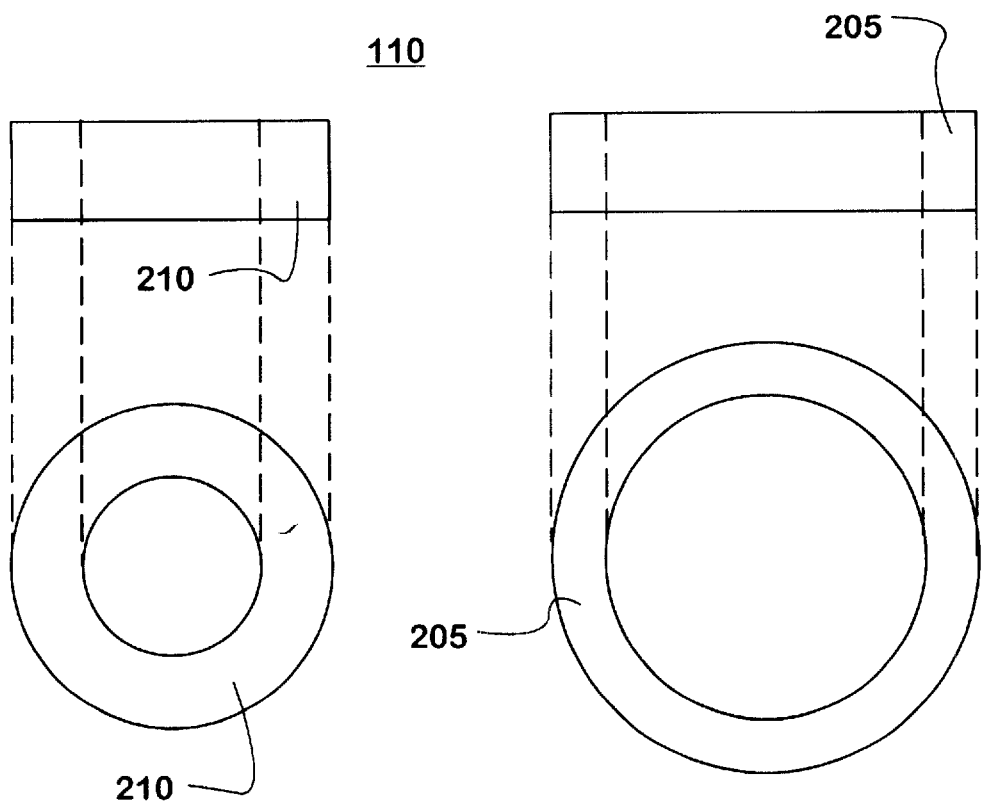
FIG. 3 shows top and side perspective views of a combustion gasket (unassembled) according to a preferred embodiment of the present invention.

FIGS. 2–3 show the combustion gasket 110 according to a preferred embodiment of the present invention. FIG. 2 shows top and side views of the combustion gasket 110 as assembled. FIG. 3 shows top and side views of the combustion gasket 110 unassembled.

The combustion gasket 115 has a resilient material structure 205 adjacent to a rigid material structure 210. Preferably, the material structures 205, 210 are arranged coaxially and coaxial to the nozzle 152. Preferably, the resilient material structure 205 is formed along a peripheral edge of the rigid material structure 210. While each is shown having a circular or ring shape, they may be oval or other shapes. A non-circular shape holds the combustion gasket 110 onto the fuel injector 105 during assembly and maintenance procedures. In addition, the resilient material structure 205 and rigid material structure 210 may not be radially joined as shown. Other materials, layers, and even gaps may separate them.

Preferably, the materials 205, 210 are press fit together. However, an adhesive or other joining method may be used. In addition, the resilient material structure 205 may be formed or layered onto the rigid material structure 210 through a deposition, cladding, or similar process.

Figure 4:
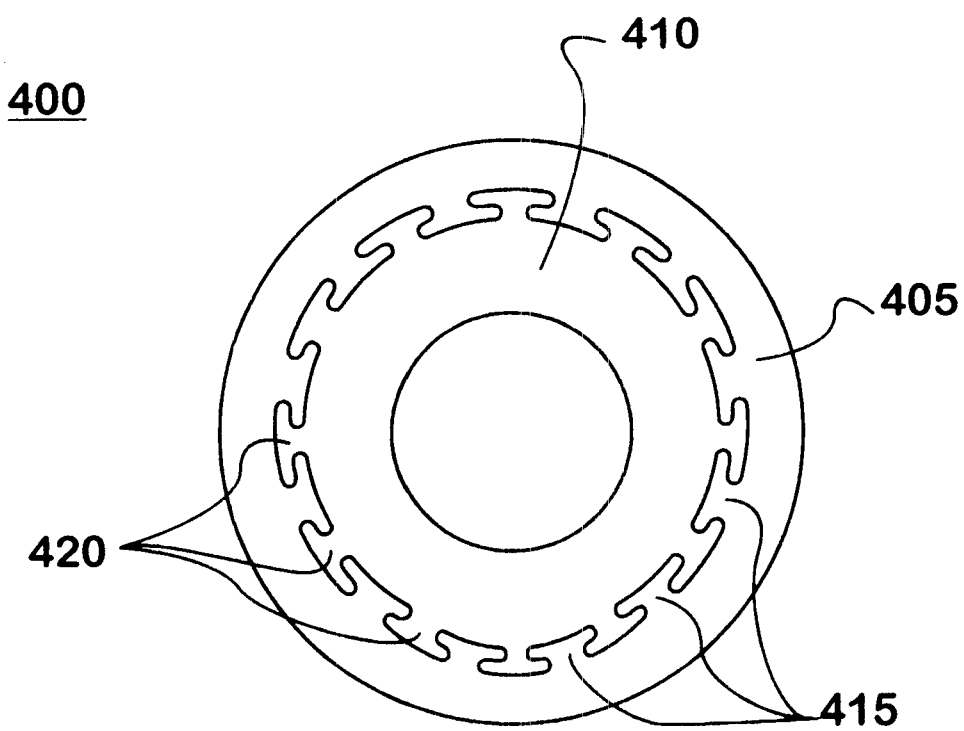
FIG. 4 shows a top perspective view of a combustion gasket (assembled) according to an alternate embodiment of the present invention.

FIG. 4 shows an alternate combustion gasket 400 according to the present invention. The alternate combustion gasket 400 is the same as combustion gasket 110 except that the resilient and rigid material structures 405, 410 have alternating mortises 415 and tenons 420 for interlocking the materials 405, 410 together. This embodiment is particularly well suited when an elastomer is used as the resilient material structure 405. The elastomer may be formed in place on the rigid material structure 410. While a mortise and tenon arrangement is illustrated, other interlocking methods may be used.

Returning to FIGS. 2 and 3, the resilient material structure 205 is made from a soft, compliable material that adjusts to seal the connection between the fuel injector 105 and the cylinder head 120. The resilient material structure 205 "adapts" to any irregularities within the connection area and does not degrade at the operating temperatures of the connection area. Preferably, the resilient material structure 205 is a non-ferrous material such as dead soft copper (solid or embossed), aluminum, or an elastomer. Preferably, the resilient material structure 205 is thicker than the rigid material structure 210 and is connected along a peripheral edge of the rigid material structure 210.

The rigid inner material 210 is made from a hard material that resists creep relaxation (extrusion) from the load of the fuel injector 105. Preferably, the rigid inner material 210 is hardened steel. However, other materials may be used, such as ceramics and composites, as long as they provide the requisite creep resistance and can survive the operating temperatures. In addition, materials 205, 210 must be compatible. For example, a combination of a ferrous material with aluminum may create a galvanic reaction at the interface unless an intermediate or protective layer is used.

In use, the combustion gasket 110 is disposed between the fuel injector 105 and the cylinder head 120. The resilient material structure 205 and the rigid material structure 210 independently engage both the nozzle and cylinder ledges 160, 165. In this manner, the rigid material structure 210 bears the load from the fuel injector 105. The amount of load may vary and the proportion borne by the rigid material structure also may vary. However, the rigid material structure 210 bears the appropriate amount of load for the resilient material structure 205 compress sufficiently, but not excessively, to properly seal the connection between the fuel injector 105 and the cylinder head 120.

Preferably, the rigid material structure 210 partially seals the connection between the fuel injector 105 and the cylinder head 120. The rigid material structure essentially creates an "orifice" for restricting the flow any combustion gases. The resilient material structure 205, being thicker than the rigid material structure 210, is compressed between the fuel injector 105 and the cylinder head. The combustion gasket is designed, based on the materials selected, to place the resilient material structure 205 under a load suitable for sealing the connection and "adapting" to surface irregularities and misalignments of the fuel injector.

Alternatively, the combustion gasket may be constructed so the rigid material structure 210 does not provide a seal. In this design, the resilient material structure 205 provides the entire sealing of the connection. While there is no "double seal" of the connection, the rigid material structure 210 bears the load from the fuel injector 105.

Alternatively, the resilient material structure 205 may be thinner than the rigid material structure 210. In this case, the rigid material structure 210 needs to be partially resilient or semi-rigid—compressible enough to place the thinner resilient material structure 205 under a load sufficient for sealing the connection and yet non-compressible enough to bear most of the load of the fuel injector 105. Additionally, the rigid material structure 210 may be partially resilient when the resilient material structure 205 is thicker than the rigid material structure 210.

While the invention has been described and illustrated, this description is by way of example only. Additional advantages will occur readily to those skilled in the art, who may make changes without departing from the true spirit and scope of the invention. For example, the combustion gasket may be used with other engine parts such as spark plugs. Therefore, the invention is not limited to the specific details, representative devices, and illustrated examples in this description. Accordingly, the scope of this invention is to be limited only as necessitated by the accompanying claims.

What is claimed is:

1. A cylinder head assembly for a diesel engine, comprising:
   a cylinder head having a cylinder ledge providing an engagement surface for a fuel injector assembly;
   a fuel injector assembly sealingly engaged with said cylinder ledge, said fuel injector assembly having an injector ledge, a fuel injection nozzle, and a combustion gasket disposed about said fuel injector nozzle and between the injector ledge and the cylinder ledge, said combustion gasket bearing the entire load of the injector against the cylinder head;
   said combustion gasket having a rigid material structure for supporting the load of the fuel injector and a resilient material structure disposed radially adjacent to the rigid material structure, wherein the rigid material structure and the resilient material structure independently engage the injector and cylinder ledges.

2. A cylinder head assembly according to claim 1, wherein the resilient material structure is thicker than the rigid material structure.

3. A cylinder head assembly according to claim 1, wherein the rigid material structure partially seals the fuel injector on the cylinder head.

4. A cylinder head assembly according to claim 1, wherein the rigid material structure is made of stainless steel and the resilient material structure is made of dead soft copper.

5. A cylinder head assembly according to claim 1, wherein the fuel injector assembly is part of a hydraulically actuated electronically controlled unit injection (HEUI) fuel injection system.

6. A combustion gasket for sealing a fuel injector onto a cylinder head in a diesel engine, wherein the fuel injector has an injector ledge and the cylinder head has a cylinder ledge and the combustion gasket is disposed therebetween, the combustion gasket comprising:
   a rigid material structure for supporting the load of the fuel injector; and
   a resilient material structure disposed radially adjacent to the rigid material structure, the resilient material for sealing the injector and cylinder ledges,
   wherein the rigid material structure and the resilient material structure independently engage the injector and cylinder ledges and together support the entire load of the injector against the cylinder head.

7. A combustion gasket according to claim 6, wherein the rigid and resilient material structures are coaxial.

8. A combustion gasket according to claim 6, wherein the fuel injector has an injection nozzle, and wherein the rigid and resilient material structures are coaxial to the injection nozzle.

9. A combustion gasket according to claim 6, wherein the resilient material structure is thicker than the rigid material structure.

10. A combustion gasket according to claim 6, wherein the rigid material structure partially seals the fuel injector on the cylinder head.

11. A combustion gasket according to claim 6, wherein the rigid material structure is made of stainless steel and the resilient material structure is made of soft copper.

12. A combustion gasket according to claim 6, wherein the fuel injector is part of a hydraulically actuated electronically controlled unit injection (HEUI) fuel injection system.

* * * * *